US008177537B2

(12) United States Patent
Cheng et al.

(10) Patent No.: US 8,177,537 B2
(45) Date of Patent: May 15, 2012

(54) METHOD AND APPARATUS FOR MAKING POROUS AGAROSE BEADS

(75) Inventors: Kwok-Shun Cheng, Nashua, NH (US); Senthilkumar Ramaswamy, Nashua, NH (US); Nanying Bian, Nashua, NH (US); Brian Gagnon, Billerica, MA (US); Umana Joaquin, Stoneham, MA (US); Neil Soice, Amherst, NH (US)

(73) Assignee: EMD Millipore Corporation, Billerica, MA (US)

( * ) Notice: Subject to any disclaimer, the term of this patent is extended or adjusted under 35 U.S.C. 154(b) by 270 days.

(21) Appl. No.: 12/660,708

(22) Filed: Mar. 2, 2010

(65) Prior Publication Data
US 2010/0227015 A1  Sep. 9, 2010

Related U.S. Application Data

(62) Division of application No. 11/520,775, filed on Sep. 13, 2006, now Pat. No. 7,678,302.

(60) Provisional application No. 60/717,371, filed on Sep. 15, 2005.

(51) Int. Cl.
*B29B 9/00* (2006.01)
(52) U.S. Cl. .................. 425/6; 425/10; 366/341
(58) Field of Classification Search .................. None
See application file for complete search history.

(56) References Cited

U.S. PATENT DOCUMENTS

| | | | |
|---|---|---|---|
| 4,732,811 A | 3/1988 | Margel | |
| 4,971,833 A | 11/1990 | Larsson et al. | |
| 5,312,571 A | 5/1994 | Pujari et al. | |
| 5,866,006 A | 2/1999 | Lihme et al. | |
| 5,888,497 A | 3/1999 | Jain et al. | |

(Continued)

FOREIGN PATENT DOCUMENTS

| | | |
|---|---|---|
| EP | 0266580 A2 | 5/1988 |
| WO | WO 93/19115 A1 | 9/1993 |
| WO | WO 00/17257 A1 | 3/2000 |

(Continued)

OTHER PUBLICATIONS

Mu Y et al: "Manufacture by water/oil emulsification of porous agarose beads: Effect of processing conditions on mean particle size, size distribution and mechanical properties," Chemical Engineering and Processing, Elsevier Sequoia, Lausanne, CH, vol. 44, No. 10, May 25, 2005, pp. 1157-1166, XP004922717 ISSN: 0255-2701.

(Continued)

*Primary Examiner* — Mary F Theisen
(74) *Attorney, Agent, or Firm* — EMD Millipore Corporation

(57) ABSTRACT

The present invention relates to a method and apparatus for forming agarose or cored agarose beads. The process involves dissolving/gelation the agarose in a suitable liquid, mixing it with a hydrophobic liquid to form an emulsion and maintaining that emulsion at a temperature equal to or greater than the gelation point of the agarose, passing it through a static mixer to create agarose droplets and solidifying the agarose droplets in a second bath of hydrophobic liquid. The beads can then be washed and used or further processed to crosslink the agarose and/or add various functionalities on to the agarose. Another method for solidifying the agarose droplets is by using a heat exchanger to cool the stream continuously after it exits the static mixer. A similar process is used for the "cored" beads except cores, preferably in bead form, are introduced to the agarose before it enters the first hydrophobic liquid so that the agarose forms a coating on the cores. A similar process with either agarose beads (made by this or another process) or cored agarose (made by this or another process) can be used to add multiple layers of agarose on to the existing beads. An apparatus for running the process is also disclosed.

6 Claims, 9 Drawing Sheets

U.S. PATENT DOCUMENTS

| | | | |
|---|---|---|---|
| 6,428,707 B1 | 8/2002 | Berg et al. | |
| 6,492,471 B1 | 12/2002 | Eisenbeiss et al. | |
| 6,841,097 B2 | 1/2005 | Andesson et al. | |
| 7,678,302 B2 | 3/2010 | Cheng et al. | |

FOREIGN PATENT DOCUMENTS

| | | |
|---|---|---|
| WO | 03/055597 A1 | 7/2003 |
| WO | WO 2004/070026 A1 | 8/2004 |

OTHER PUBLICATIONS

Porath, Jerker and Janson, Jan-Christer and Laas, Torgny, *Journal of Chromatography*, 60 (1971) pp. 167-177.

Partial European Search Report EP 1764151 A1, Dec. 15, 2006.

Partial European Search Report EP 1764152 A1, Dec. 15, 2006.

Belyaeva, et al., "Immobillization of α-chymotrysin in κ-carrageenan beads prepared with the static mixer," Enzyme and Microbial Technology 34 (2004), pp. 108-113.

METHOD AND APPARATUS FOR MAKING POROUS AGAROSE BEADS

CROSS REFERENCE RELATED APPLICATIONS

The present utility patent application is a divisional patent application of U.S. patent application Ser. No. 11/520,775, filed on Sep. 13, 2006, projected U.S. Pat. No. 7,678,302, projected Issue Date of Mar. 16, 2010, which claims the benefit of priority of U.S. Provisional Patent Application No. 60/717,371, filed on Sep. 15, 2005, the entire content of each of which is incorporated herein in its entirety.

FIELD OF THE INVENTION

The present invention relates to a process and apparatus for making porous agarose beads. More particularly, it relates to a continuous process and apparatus for making porous agarose beads which are either homogeneous or cored.

BACKGROUND OF THE INVENTION

Agarose beads are the most common base matrix for chromatography media. Agarose is ideal as a base matrix because of its minimal non-specific absorption, hydrophilicity, strong chemical resistance to acid, base and solvents, high porosity and abundance of OH groups for crosslinking and functionalization. Most ion-exchange and affinity packed-bed media are based on agarose beads. Another type of media is particles with an agarose coating on the outside. Such particles are useful for fluidizing bed because the density of those particles must be controlled to counter the buoyancy of the fluidizing flow.

The most common method of making agarose beads is by contacting an aqueous liquid and a hydrophobic liquid in a stirring vessel. This batch process can be used for making both homogeneous and cored beads. In the case of homogeneous beads, agarose solids are dissolved in water heated to about 90° C. The hot solution is then poured into a hot hydrophobic fluid in a stirring vessel. The hydrophobic fluid can be a solvent such as toluene or mineral oil. Since the two fluids don't mix, constant agitation turns the two liquids into an emulsion with the agarose solution as droplets suspended in the hydrophobic fluid. Normally, a surfactant soluble in the phobic fluid is added to stabilize the droplets so they don't coalesce into larger ones. The emulsion is then cooled to cause the agarose beads to gel. The solids are then washed and sieved to narrow the distribution to the useful range.

U.S. Pat. Nos. 4,971,833 and 5,866,006 use this same process to produce cored beads. The only difference is mixing cores with the agarose solution before mixing with the phobic fluid. Agitation breaks up the agglomeration of cores and agarose solution into smaller units. After a certain residence time of about 5-10 minutes, the solution is cooled down gradually generally in about 30 minutes to solidify the agarose solution into a gel. The solids are then washed and sieved to narrow the distribution to the useful range.

For homogeneous beads, the limitation of the batch process is the throughput. In order for the agarose to form droplets, the volume of the phobic phase has to be at least 3 to 1 that of the agarose solution. For example, to prepare 500 L of beads, a vessel must contain a total of 2000 L of solvent and agarose solution. In large operations, it is not uncommon to use reactors with several thousand of gallons capacity. Big vessels like this take much longer time to heat and cool. In addition even with the most optimal settings, the distribution of the bead size is wide and low single core would result. Further, mixing inside a stirring vessel is inherently a statistical process. Each bead follows its own path and each one has a different shear history. Due to these non-uniformities, the resulting beads can have widely different properties in terms of size and/or coating thickness, etc.

Most patents describe bench scale processes in which the whole process, heating and cooling, happen within 30 minutes. In actual mass production scale, the process time could be much longer. Additionally, since a flammable solvent such as toluene is used most of the time, explosion-proofing the equipment and facilities can get very expensive.

There are additional problems using this process to produce cored beads. The shear forces are non-uniform in a mixing vessel. In the dead areas of the vessel, shear forces are not sufficient to break up the cores, thus resulting in large agglomerations of multiple cores. However, if the stirring speed is too high, the shear forces near the impeller may strip the agarose solution partially and/or completely away from the core. For this reason, a mixing vessel usually produces a low yield of single core beads. A majority of the beads have two or more cores. While multiple cores may be desirable for fluidizing bed to increase their density and control their movement in the bed, See U.S. Pat. No. 6,428,707, it is not the preferred population for packed bed chromatography in which control of the diffusion path and rigidity are the ultimate goals.

Instead of a bulky batch process, it is desirable to use a truly continuous process for bead manufacturing. Although batch agarose processing are widely researched and documented, patents and literatures are silent when it comes to continuous processing.

Therefore, it is highly desirable to develop a process that has high throughput, high single core yield, is continuous, does not require explosion proof equipment, is compact in size and inexpensive to build and operate. To provide further flexibility, it is also desirable to use the same process to produce either homogenous or cored beads. The present invention provides such a process.

SUMMARY OF THE INVENTION

The present invention relates to a method and apparatus for forming agarose or cored agarose beads. The process involves dissolving/gelation the agarose in a suitable liquid, mixing it with a hydrophobic liquid containing an emulsifier of the type used to stabilize water-in-oil emulsions to form an emulsion and maintaining that emulsion at a temperature equal to or greater than the gelation temperature of the agarose, passing it through one or more static mixers to create agarose droplets and solidifying the agarose droplets in a second bath of hydrophobic liquid. Another method for solidifying the agarose droplets is by using a heat exchanger to cool the stream continuously after it exits the static mixer. The beads can then be washed and used or further processed to crosslink the agarose and/or add various functionalities on to the agarose.

A similar process is used for the "cored" beads except cores, preferably in bead form, are introduced to the agarose before it enters the first hydrophobic liquid so that the agarose forms a coating on the cores.

A similar process with either agarose beads (made by this or another process) or cored agarose (made by this or another process) can be used to add multiple layers of agarose on to the existing beads.

An apparatus for making the beads according to the process includes an agarose gelation tank, a first bath, one or more static mixers and a second bath all preferably in line and all preferably in fluid communication with each other so as to create a continuous process.

Another apparatus can replace at least the second bath with a heat exchanger to cool the agarose beads upon exiting the static mixer. Alternatively both baths can be replaced by heat exchangers, the first to heat the emulsion and maintain the agarose at or above its gelation point and the second to cool down the agarose beads formed by the static mixer to cause the agarose to gel and form either a bead or a coating on a core as the case may be. A further embodiment uses a first heat exchanger to form the agarose solution, a second heat exchanger to form a heated hydrophobic liquid with emulsifier or surfactant, a static mixer to receive the liquids of the first and second heat exchangers so as to form an emulsion and form the agarose droplets and a third heat exchanger to receive the agarose droplets and hydrophobic liquid and cool them below the gelation point of the agarose to cause the agarose to form either homogeneous beads or agarose coated cored beads. Another embodiment uses a first heat exchanger to form the agarose solution, a second heat exchanger to form the heated first liquid with emulsifier or surfactant, a first static mixer to receive the liquids of the first and second heat exchangers so as to form an emulsion, a second static mixer to receive the emulsion and form the agarose droplets and a third heat exchanger to receive the agarose droplets and cool them in a second liquid below the gelation point of the agarose to cause the agarose to form either homogeneous beads or agarose coated cored beads.

One application for beads of this process, especially homogeneous beads is as a packed bed chromatography media.

An application for the cored beads made by this process is for a fluidized or magnetized bed.

Another application for these cored beads is to provide rigidity and to control the mass transfer path of the packed-bed media. A rigid media can be stacked higher, thus attaining higher absorbing or exchanging capacity. By shortening the diffusion path, the gel can be utilized at a much higher efficiency than homogeneous beads. Under certain operating conditions, cored beads can result in sharper elution peaks and less buffer consumption.

It is an object of the present invention to provide a process for the manufacture of agarose beads comprising:
  a. adding agarose to an aqueous solution;
  b. heating the solution to a temperature above the gelation point of the agarose;
  c. adding the heated solution to a first hydrophobic liquid and a emulsifier heated to a temperature such that the resulting emulsion is at or above the gelation temperature of the agarose solution and has a continuous and discontinuous phase in which the hydrophobic liquid and emulsifier is the continuous phase and the agarose solution is the discontinuous phase;
  d. pumping the emulsion through a static mixer to create agarose droplets;
  e. flowing the droplets into a second hydrophobic liquid cooled to a temperature below that of the gelation point of the agarose to gel the agarose droplets into beads; and
  f. separating the agarose beads from the hydrophobic liquid.

It is a further object of the present invention to provide a process for the manufacture of agarose beads comprising:
  g. adding agarose and a plurality of cored beads to an aqueous solution;
  h. heating the solution to a temperature above the gelation point of the agarose;
  i. adding the heated solution to a first hydrophobic liquid and a emulsifier heated to a temperature such that the resulting emulsion is at or above the gelation temperature of the agarose solution and has a continuous and discontinuous phase in which the hydrophobic liquid and emulsifier is the continuous phase and the agarose solution is the discontinuous phase;
  j. pumping the emulsion through a static mixer to create agarose droplets;
  k. flowing the droplets into a second hydrophobic liquid cooled to a temperature below that of the gelation point of the agarose to gel the agarose droplets into beads; and
  l. separating the agarose beads from the hydrophobic liquid.

It is another object of the present invention to a process for the manufacture of agarose beads comprising:
  (a) adding agarose to an aqueous solution;
  (b) heating the solution to a temperature above the gelation point of the agarose;
  (c) adding the heated solution to a first bath containing a hydrophobic liquid and a emulsifier heated to a temperature such that the resulting emulsion is at or above the gelation temperature of the agarose solution and has a continuous and discontinuous phase in which the hydrophobic liquid is the continuous phase and the agarose solution is the discontinuous phase;
  (d) pumping the emulsion through a static mixer to create agarose droplets;
  (e) flowing the droplets into a second bath containing a hydrophobic liquid cooled to a temperature below that of the gelation point of the agarose to form porous agarose beads;
  (f) separating the agarose beads from the liquid of the second bath;
  (g) crosslinking the agarose beads of step (f);
  (h) forming a second of agarose in an second aqueous solution and heating the second solution to a temperature above the gelation point of the second agarose;
  (i) adding the agarose beads of step (g) to the second solution;
  (j) adding the beads of step (g) and solution of step (h) to a third bath containing a hydrophobic liquid wherein the third bath is heated to a temperature such that the resulting emulsion is at or above the gelation temperature of the agarose solution and has gelation a continuous and discontinuous phase in which the hydrophobic liquid is the continuous phase and the beads and second agarose solution of step (i) is the discontinuous phase;
  (k) pumping the emulsion of step (j) through a static mixer into a fourth bath containing a hydrophobic liquid cooled to a temperature below that of the gelation point of the second agarose to form a coating of the second agarose on the agarose beads of step (g); and
  (l) separating the coated agarose beads of step (k) from the liquid of the fourth bath.

It is another object of the present invention to a process for the manufacture of porous agarose beads comprising:
  (a) adding agarose to an aqueous solution;
  (b) heating the solution to a temperature above the gelation point of the agarose;
  (c) adding the heated solution to a first bath containing a hydrophobic liquid and a emulsifier heated to a temperature such that the resulting emulsion is at or above the gelation temperature of the agarose solution and has a continuous and discontinuous phase in which the hydrophobic liquid is the continuous phase and the agarose solution is the discontinuous phase;

(d) pumping the emulsion through a static mixer to create droplets and flowing the droplets into a second bath containing a hydrophobic liquid cooled to a temperature below that of the gelation point of the agarose to form porous agarose beads;
(e) separating the agarose beads from the liquid of the second bath;
(f) crosslinking the agarose beads of step (e);
(g) forming a second of agarose in an second aqueous solution and heating the second solution to a temperature above the gelation point of the second agarose;
(h) adding the agarose beads of step (f) to the second solution;
(i) adding the beads and solution of step (h) to a third bath containing a hydrophobic liquid wherein the third bath is heated to a temperature such that the resulting emulsion is at or above the gelation temperature of the agarose solution and has a continuous and discontinuous phase in which the hydrophobic liquid is the continuous phase and the beads and second agarose solution of step (h) is the discontinuous phase;
(j) pumping the emulsion of step (i) through a static mixer into a fourth bath containing a hydrophobic liquid cooled to a temperature below that of the gelation point of the second agarose to form a coating of the second agarose on the agarose beads of step (f);
(k) separating the coated agarose beads of step (j) from the liquid of the fourth bath; and
(l) repeating steps (f)-(l) one or more times to form multi-layered beads.

It is a further object of the present invention to a process for the manufacture of porous agarose beads comprising:
(a) adding agarose to an aqueous solution;
(b) heating the solution to a temperature above the gelation point of the agarose;
(c) adding the heated solution to a first bath containing a hydrophobic liquid and an emulsifier heated to a temperature such that the resulting emulsion is at or above the gelation temperature of the agarose solution and has a continuous and discontinuous phase in which the hydrophobic liquid is the continuous phase and the agarose solution is the discontinuous phase;
(d) pumping the emulsion through a static mixer to create droplet that are then flowed into a second bath containing a hydrophobic liquid cooled to a temperature below gelation the gelation temperature of the agarose to form porous agarose beads;
(e) separating the agarose beads from the liquid of the second bath;
(f) crosslinking the agarose beads of step (e);
(g) forming a second of agarose in an second aqueous solution and heating the second solution to a temperature above the gelation point of the second agarose;
(h) adding the agarose beads of step (f) to the second solution;
(i) adding the beads and solution of step (h) to a third bath containing a hydrophobic liquid and a emulsifier wherein the third bath is heated to a temperature such that the resulting emulsion is at or above the gelation temperature of the agarose solution and has gelation a continuous and discontinuous phase in which the hydrophobic liquid is the continuous phase and the beads and second agarose solution of step (h) is the discontinuous phase;
(j) pumping the emulsion of step (i) through a static mixer into a fourth bath containing a hydrophobic liquid cooled to a temperature below that of the gelation point of the second agarose to form a coating of the second agarose on the agarose beads of step (f); and
(k) separating the coated agarose beads of step (j) from the liquid of the fourth bath.

It is an additional object of the present invention to provide an apparatus for making agarose beads comprising a first heated vessel at a temperature at or above a gelation point of the agarose for dissolving the agarose in an aqueous solution, an inlet to the first vessel for the introduction of the aqueous solution, a first heated bath containing a hydrophobic liquid and a emulsifier maintained at a temperature at or above the gelation point of the agarose, a first inlet to the first bath for the hydrophobic liquid and a second inlet to the first bath for the solution of the first vessel, said second inlet being in fluid communication with the first vessel, an outlet from the first bath in fluid communication with an inlet of a static mixer, an outlet from the static mixer being in fluid communication with an inlet to a second bath, the second bath containing a hydrophobic liquid maintained at a temperature below the gelation point of the agarose and an outlet from the second bath.

It is another object of the present invention to replace the second hydrophobic liquid with a heat exchanger through which the first liquid is passed after exiting the static mixer so as to cool the droplets and hydrophobic liquid to a temperature below that of the gelation point of the agarose gel the agarose droplets into beads; and then recovering the agarose beads from the hydrophobic liquid.

It is a further object to provide an apparatus for making agarose beads comprising a tank for gelation agarose in an aqueous solution, a bath for heating a first hydrophobic liquid and an emulsifier, a first outlet from the tank and a second outlet from the bath merging into an inlet of a static mixer to create an emulsion of the solution from the tank and the bath which is at or above the gelation temperature of the agarose solution, an outlet from the first static mixer connected to an inlet of a heat exchanger capable of cooling to a temperature below the gelation point of the agarose in order to cause the droplets to gel into agarose beads and an outlet the heat exchanger.

It is an additional object to replace the bath and tank with heat exchangers to heat both the agarose and aqueous solution and the hydrophobic liquid with emulsifier before blending them into the static mixer.

It is an object of the present invention to provide an apparatus for making agarose coated beads comprising a first heated vessel at a temperature at or above a gelation point of the agarose for dissolving the agarose in an aqueous solution and mixing the dissolved agarose solution with a plurality of bead cores, an inlet to the first vessel for the introduction of the aqueous solution, a first heated bath containing a hydrophobic liquid maintained at a temperature at or above gelation point of the agarose, a first inlet to the first bath for the hydrophobic liquid and a second inlet to the first bath for the solution of the first vessel, said second inlet being in fluid communication with the first vessel, an outlet from the first bath in fluid communication with an inlet of a static mixer, an outlet from the static mixer being in fluid communication with an inlet to a second bath, the second bath containing a hydrophobic liquid maintained at a temperature below the gelation point of the agarose, an outlet from the second bath for recovering the coated beads.

It is an additional object of the present invention to provide an apparatus for making agarose beads comprising a first heat exchanger maintained at a temperature at or above a gelation point of the agarose for dissolving the agarose in an aqueous solution, a second heat exchanger containing a hydrophobic liquid and an emulsifier maintained at a temperature at or above gelation point of the agarose, an outlet of the first heat exchanger and an outlet of the second heat exchanger being in fluid communication an inlet of a first static mixer for forming an emulsion of the solution of the first heat exchanger and the liquid of the second heat exchanger, an outlet from the first static mixer being in fluid communication with an inlet of a second static mixer for creating droplets of the emulsion, an outlet from the second static mixer being in fluid communication with an inlet to a third heat exchanger, the third heat exchanger containing a hydrophobic liquid maintained at a temperature below the gelation point of the agarose in order to cause the agarose droplets to gel and an outlet from the third heat exchanger.

IN THE DRAWINGS

FIG. 1A shows a block diagram of an embodiment of the process according to the present invention.

FIG. 1BA shows a block diagram of an alternative embodiment of the process of FIG. 1A according to the present invention.

DETAILED SPECIFICATION

To minimize the non-uniformities in agarose bead formation and to create a continuous method for making such beads, instead of a stirring vessel, the present invention utilizes a static mixer to form the beads. Preferably it is a small diameter, short, high shear static mixer. Since a static mixer has a very small hold-up volume and is inherently continuous, the shear history of the beads are much more uniform than that in a stirring vessel. Dead areas are almost non-existent in a static mixer. Since the holdup volume is very small, the shear field is very uniform. This uniformity allows a static mixer to operate at a much lower shear rate when compared with a homogenizer approach. The uniform, lower shear rate gives better control to make beads with set size ranges and coating thicknesses and yielding higher percentages of single cored beads.

In order to generate sufficiently high shear to break up the agglomerates and control particle size of the cored and homogeneous agarose beads, a high flow rate of from about 50 to about 6000 hr is pumped through a small bore, from about 0.125 inch (3.17 mm) to about 1 inch (25.4 mm) static mixer. Alternatively or in addition one can choose a mixer with elements that create high shear at the same or lower speeds to create the desired shear needed to break up agglomerates and control the particle size of the beads. Suitable static mixers include for example Kenics static mixers such as Model KMR-SAN-12 a 0.5 inch (12.7 mm) diameter, 12 element mixer and a Ross ISG static mixer with a 0.5 inch (12.7 mm) diameter and 10 elements. Other static mixers are commercially available and would be useful in the present invention as well.

Homogenous beads are formed through the above process with variations in size ranges being determined by the shear used, the amount of agarose in solution and the like.

A combination of all of the factors above produce cored particles with substantially uniform coating with single cores as the predominant population. At the optimal operating conditions, single core yield can be as high as 80%. With a conventional stirring vessel of the prior art, the optimized yield is around 30%.

Figure 1A:
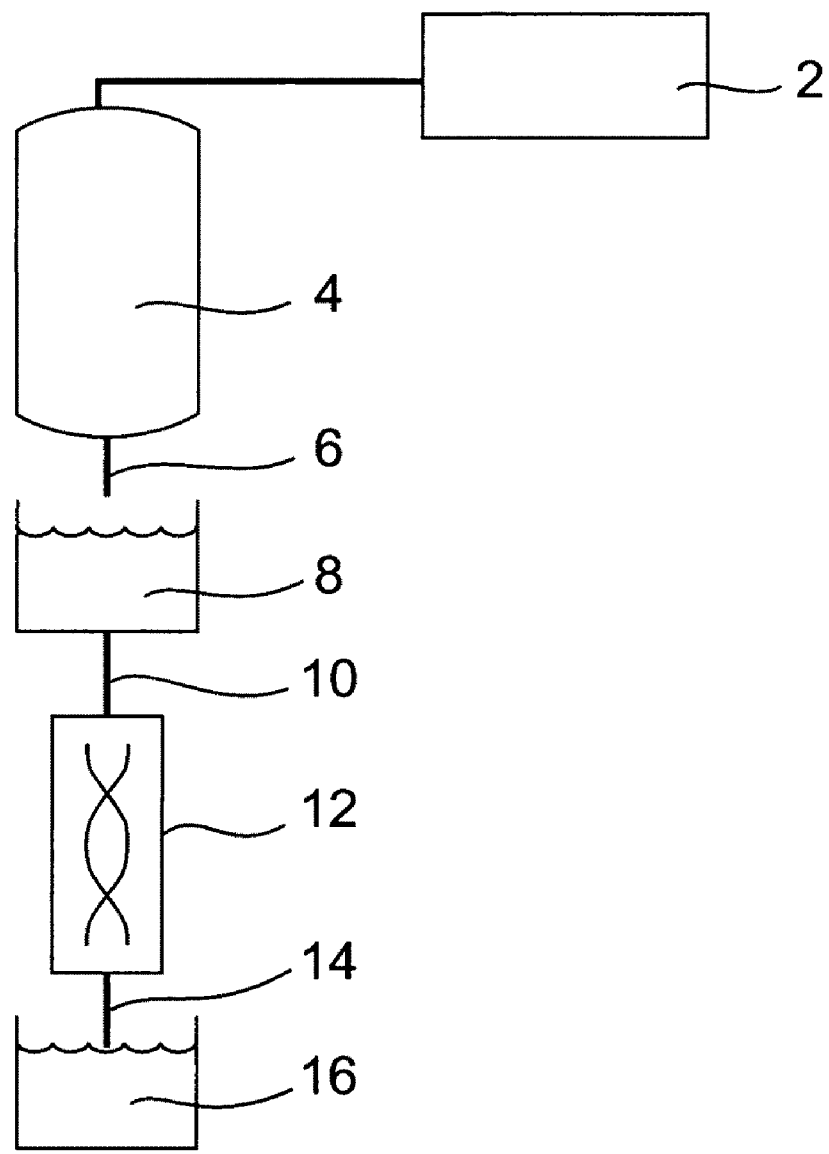

A method of making beads is as follows and as shown in FIG. 1A. Agarose 2 is added to a vessel 4 or tank with an aqueous solution and heated to a temperature at or above its gelation point (depending on the agarose this is generally from about 80° C. to about 120° C.) to dissolve the agarose in the aqueous solution.

While water is the preferred solvent for the agarose, a minor amount, up to 20% by weight of the aqueous solution, of one or more co-solvents may be added to improve the solubility of the agarose. Examples of suitable co-solvents are dimethylacetamide and/or dimethylsulfoxide. Others are known to those skilled in the art.

The solution 6 with the dissolved agarose is then added to a first bath 8 that contains a hydrophobic fluid and a emulsifier such as Span® 80 emulsifier from Sigma Chemical, the hydrophobic fluid is preferably an oil, such as mineral oil, which is heated at or above the temperature of the gelation point of the agarose in order to keep it in solution. This forms a liquid emulsion 10 having a continuous and discontinuous phase in which the oil is the continuous phase and the agarose solution is the discontinuous phase. Preferably the bath 8 is stirred or agitated (not shown) to maintain the emulsion 10. The length of time the solution and hydrophobic liquid remain in the bath 8 is dependent upon the speed at which the emulsion forms, the temperature of the bath, the amount of agarose added to the bath, the amount, if any, of agitation in the bath and other such parameters. Typically, the solution should reside in the bath only for a period of time sufficient to form the emulsion. Typically that is from about 3 minutes to 30 minutes. Preferably, the use of agitation helps expedite the emulsion formation. Agitation can be achieved by using a variety of mixers as are well known in the art. A preferred means for creating agitation in a bath system is with an overhead stirrer such as an IKA Model P4 stirrer for about 5 minutes.

The emulsion 10 is then flowed or preferably pumped through a static mixer 12 to create agarose solution droplets 14 of suitable size for the beads that are desired. The droplets 14 exit the static mixer 12 into a second hydrophobic fluid containing bath 16 (preferably with no emulsifier) maintained at a temperature below that of the gelation point of the agarose. This causes the agarose solution droplets to gel and form self supporting agarose structures of a generally spherical shape. Preferably the second bath 16 is at a temperature of from about 1° C. to about 70° C., more preferably from about 1 to 25° C. and most preferably from about 5° C. to about 10° C.

The beads can then be recovered, such as by decanting or centrifugal separation and preferably are washed with water and preferably maintained in a wet state such as in a water bath. This optional rinsing step is generally done at temperatures between about 15° C. and about 50° C., preferably between 20° C. and 50° C. in order to remove any hydrophobic liquid from the baths that may have otherwise become entrained or trapped with the porous bead structure. The beads may then be used as is or subjected to further treatment such as crosslinking and/or functionalization.

Optionally, the beads can after crosslinking be subjected to a second pass through the process to create another layer of agarose on top of the bead. Additional passes through the process after that can also be done. The agarose can be the same or different (for example in % of agarose, e.g. 3% agarose solution vs, a 6% or 4% solution; in additives; etc).

Figure 1B:
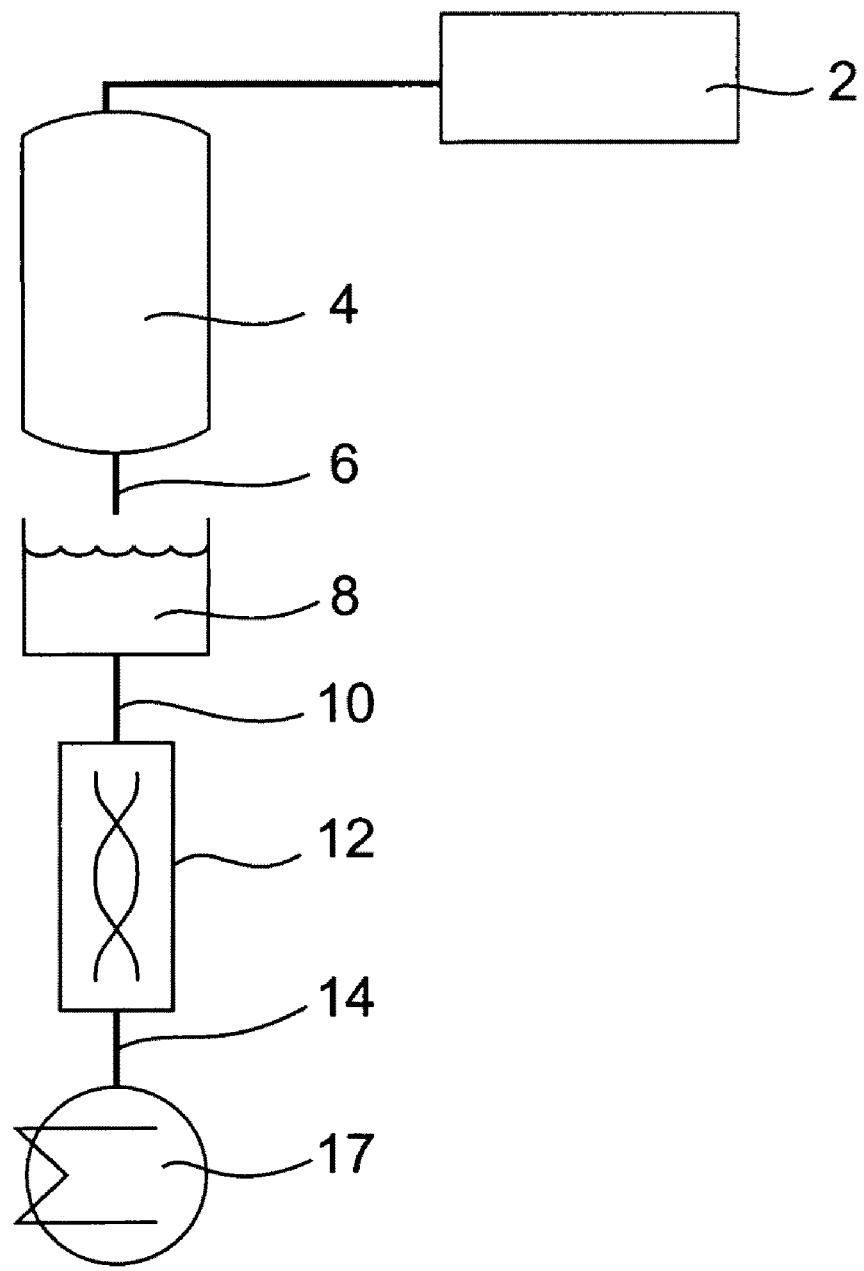

As mentioned above in the Summary of the Invention one alternative embodiment to that of FIG. 1A (shown in FIG. 1B) has the second fluid bath 16 replaced by a heat exchanger 17 which cools the first hydrophobic fluid containing the droplets to a temperature below the gelation point of the agarose causing them to gel and form self supportive agarose structures. The heat exchanger 17 can be of a length and have a capability to reduce the temperature of the agarose exiting the static mixer in a controlled manner. It may be capable of one temperature of if desired may either be subdivided or formed of several heat exchangers in a row so as to supply a gradient of temperatures tot the liquid. Generally, the heat exchanger should be at a temperature of from about 1° C. to about 70° C., more preferably from about 1 to 50° C. and most preferably from about 15° C. to about 45° C.

Also as discussed in the Summary of the Invention above, the agarose melting tank 4 and/or the first bath 8 may be replaced by heat exchangers in addition to or in lieu of the second bath, if desired (not shown).

Figure 2:
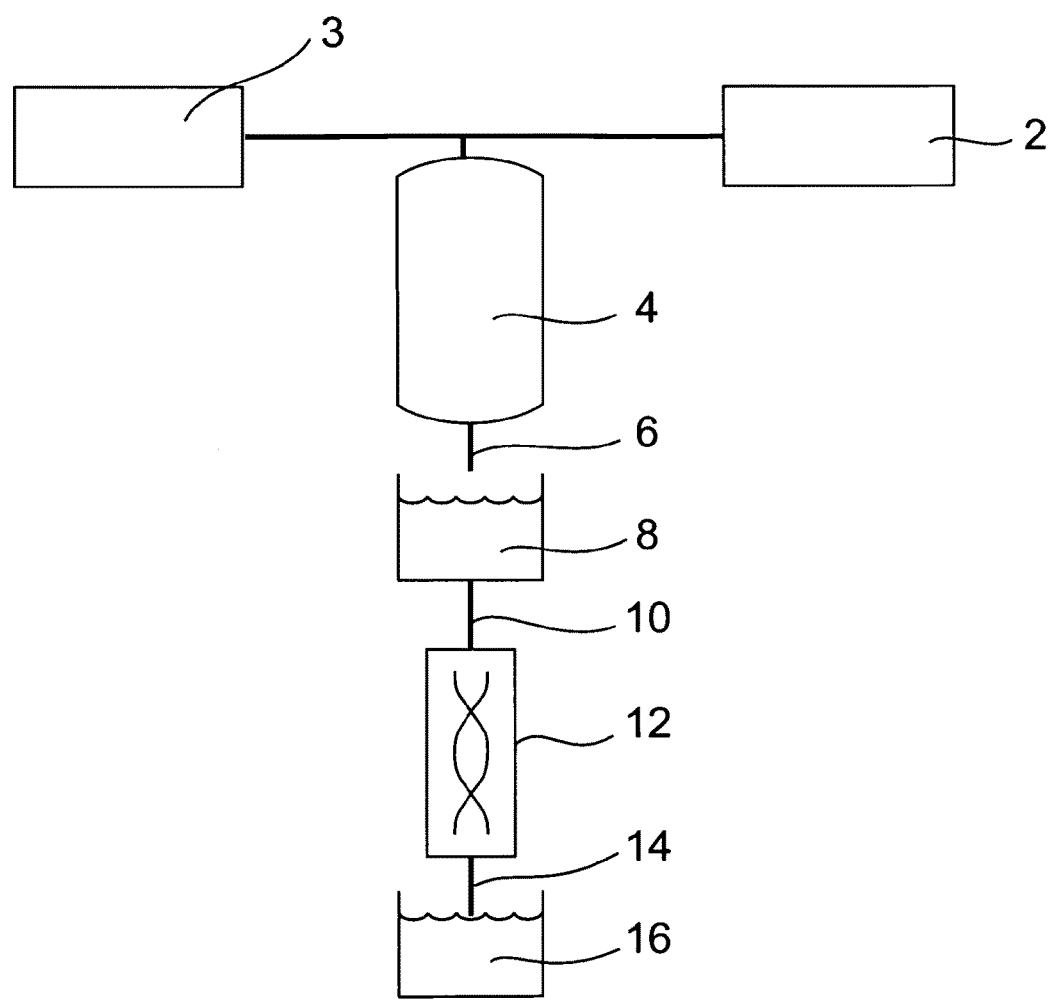
FIG. 2 shows a block diagram of a second embodiment of the process according to the present invention.

A similar process shown in FIG. 2 can be used to create cored beads which have a central core 3 of one material and one or more layers of agarose coated on top of the core. The cores 3 are introduced into the process at the first step (the vessel 4) and are coated with the agarose 2 during the process.

Ultimately, the system can be designed such that one or both baths as well as the solution vessel are replaced with heat exchanger devices.

Figure 3:
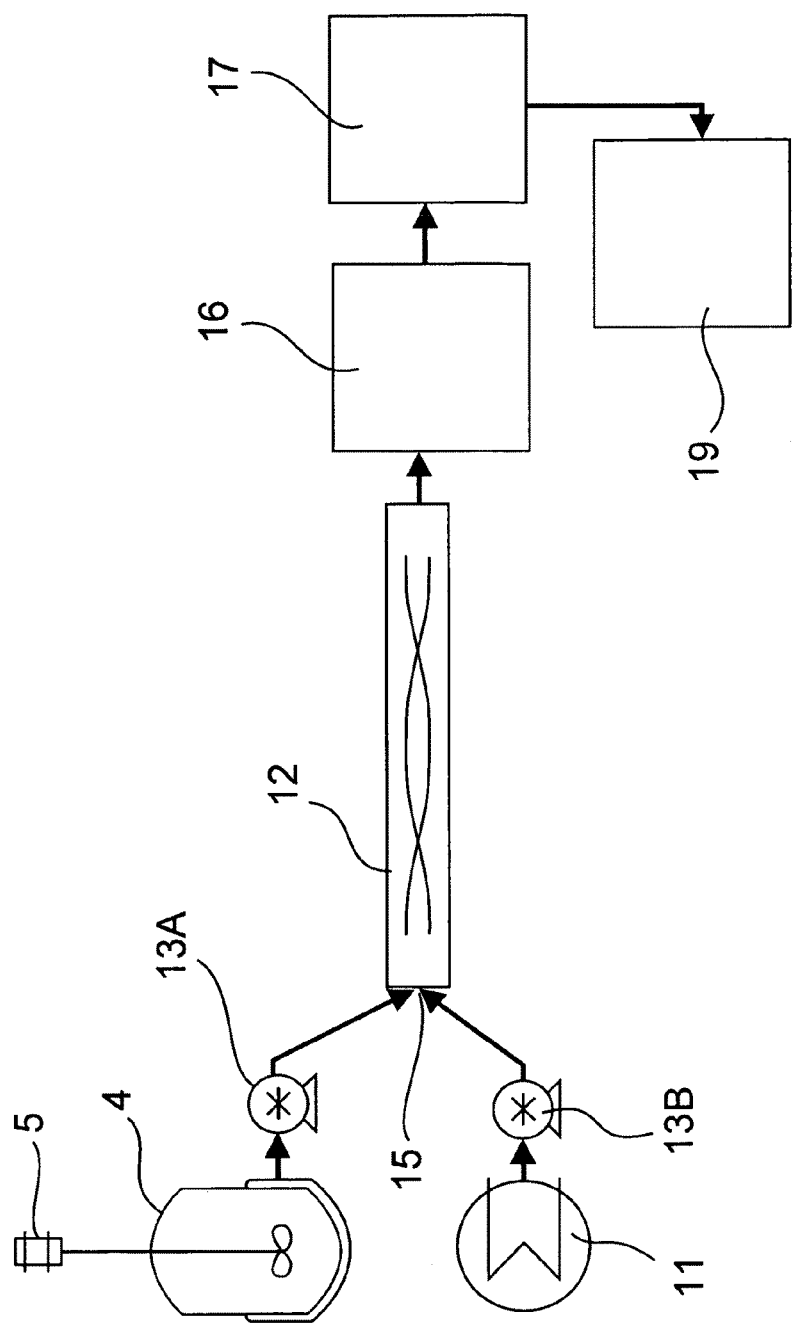
FIG. 3 shows a diagram of third embodiment of the process according to the present invention.

In another embodiment shown at FIG. 3, the agarose 2 is dissolved in a heated vessel 4 as explained above, preferably with some stirring as shown by stirrer 5 while the hydrophobic fluid 9 is heated separately in a heat exchanger 11. The contents of the vessel 4 and the heat exchanger 11 are pumped through pumps 13A and B to an inlet 15 of a static mixer 12 to form the emulsion as well as to create the droplets of agarose. The droplets are then flowed into a bath 16 containing a hydrophobic liquid cooled to a temperature below the gelation point of the agarose to cause the droplets to gel. The beads can then be separated such as in an oil/bead/water separator 17 and as optionally, the beads can then be sieved or fractionated into different sizes by a fractionator or sieve 19. Homogeneous beads and cored beads of the present invention can be made by the same process and equipment, the only difference being that the cores are also added to the vessel 4 in FIG. 3 when used.

Figure 4:
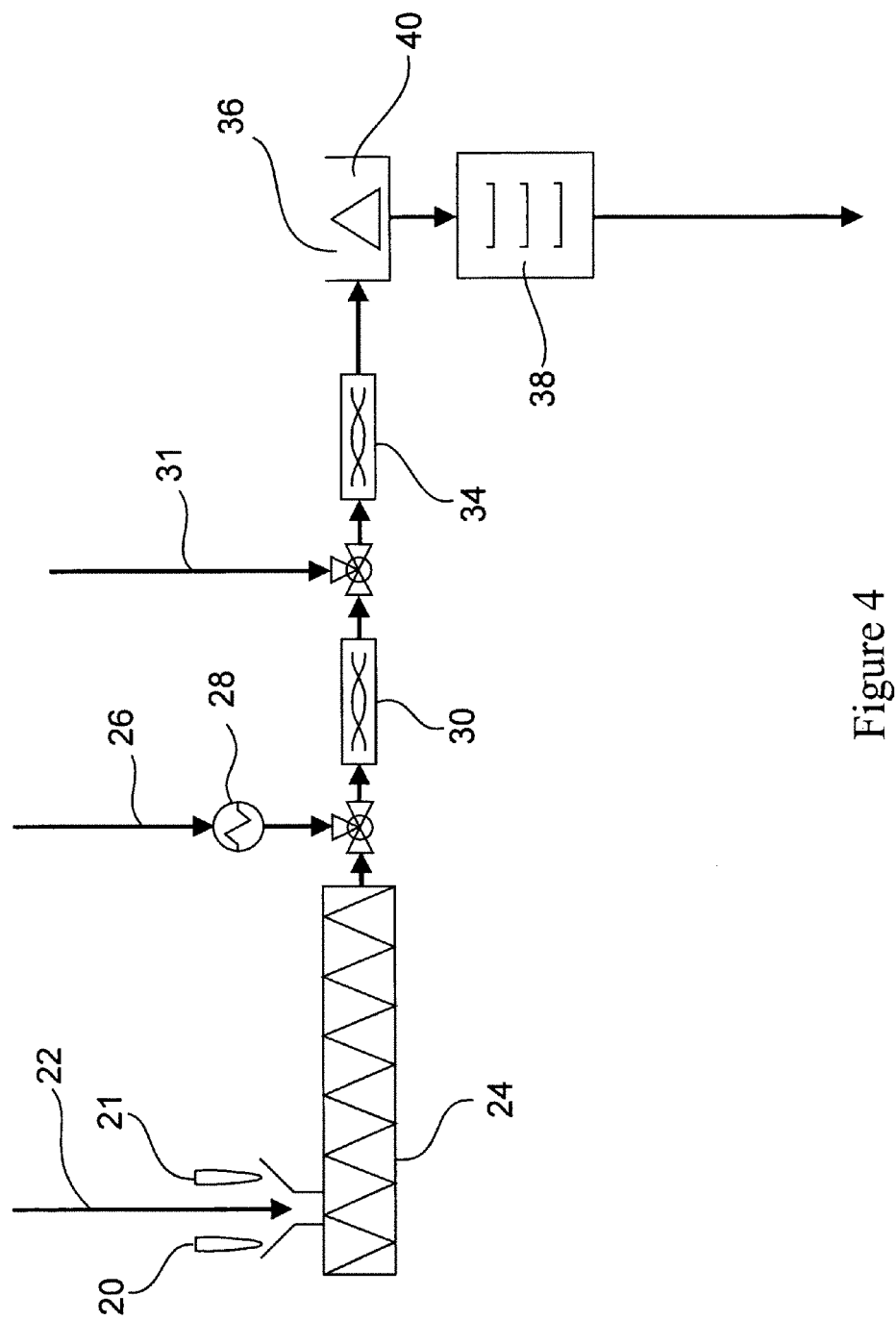
FIG. 4 shows a diagram of fourth embodiment of the process according to the present invention.

FIG. 4 shows another method and device for making beads according to the present invention. In this embodiment, all vessels and baths are replaced with compounders, heat exchangers and/or static mixers. The agarose 20, optionally cores 21 if used, and aqueous solution 22 are added to a heated compounder 24. Optionally, the aqueous solution can be preheated to speed the gelation of the agarose. The hydrophobic liquid containing an emulsifier 26 is heated in a first heat exchanger 28 and the hydrophobic liquid 26 and agarose solution from the compounder 24 are mixed in a first static mixer 30 to form the agarose or agarose/core droplets. The second hydrophobic liquid 31 is either supplied at a temperature below that of the gelation point of the agarose as shown (e.g. at room temperature or 20° C.) or it can be cooled in a second heat exchanger (not shown) and the second liquid and the output of the first static mixer 30 are flowed through a second static mixer 34 to cause the droplets to gel. The fluid from the second static mixer can then optionally be separated in this instance using a centrifuge 36 with the beads going to a sieve 38 and the rest of the material (aqueous solution, hydrophobic liquids, etc) either going to waste or a recycle system 40.

Figure 5:
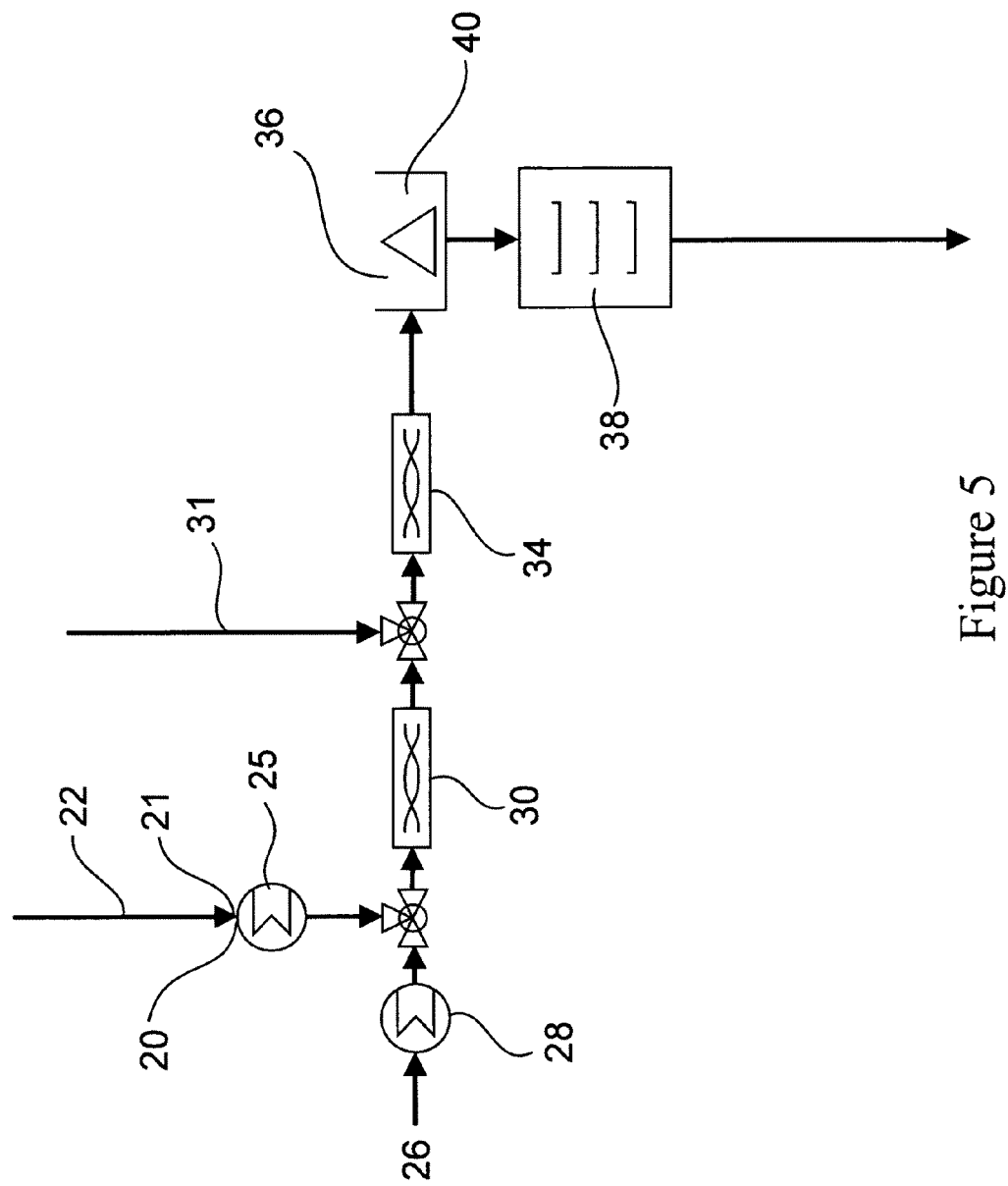
FIG. 5 shows a diagram of fifth embodiment of the process according to the present invention.

FIG. 5 shows a further method and device for making beads according to the present invention. In this embodiment, the method and system is substantially identical to that of FIG. 4 except the compounder 24 is replaced by a heat exchanger 25 which heats the agarose, aqueous solution and optionally cores if used.

Figure 6:
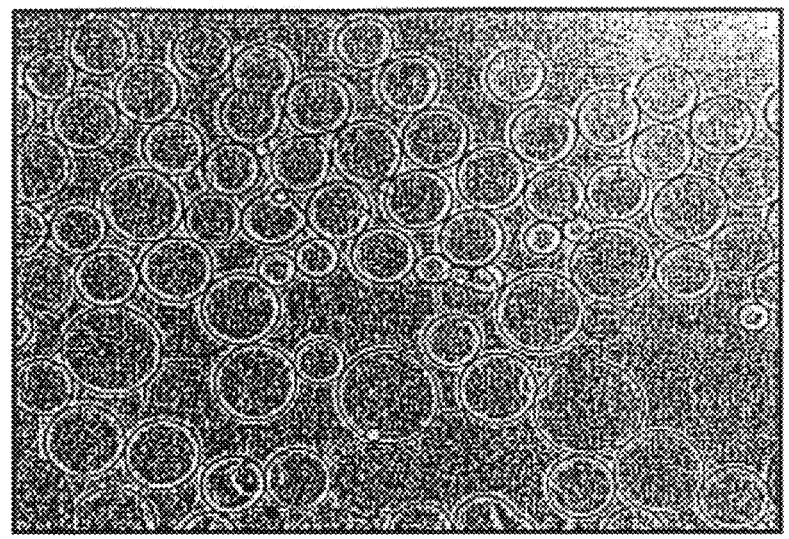
FIG. 6 shows a particle formed by one of the embodiments of the present invention.
Figure 7:
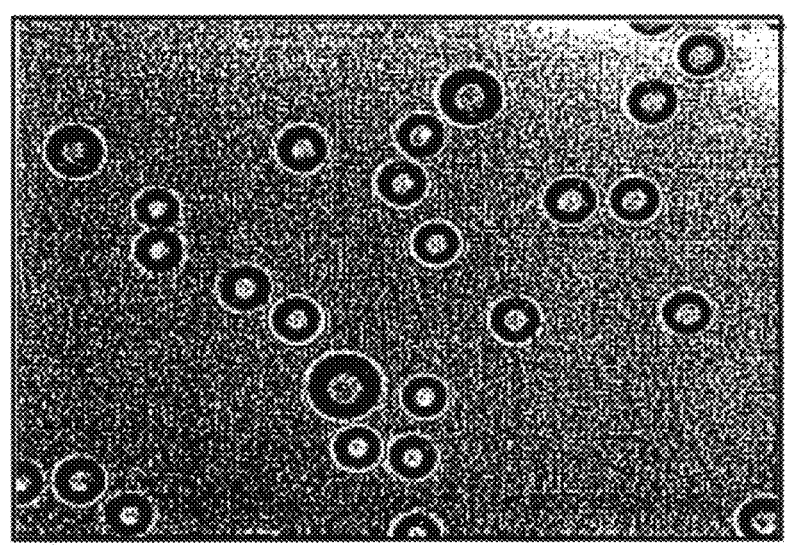
FIG. 7 shows a particle formed by one of the embodiments of the present invention.
Figure 8:
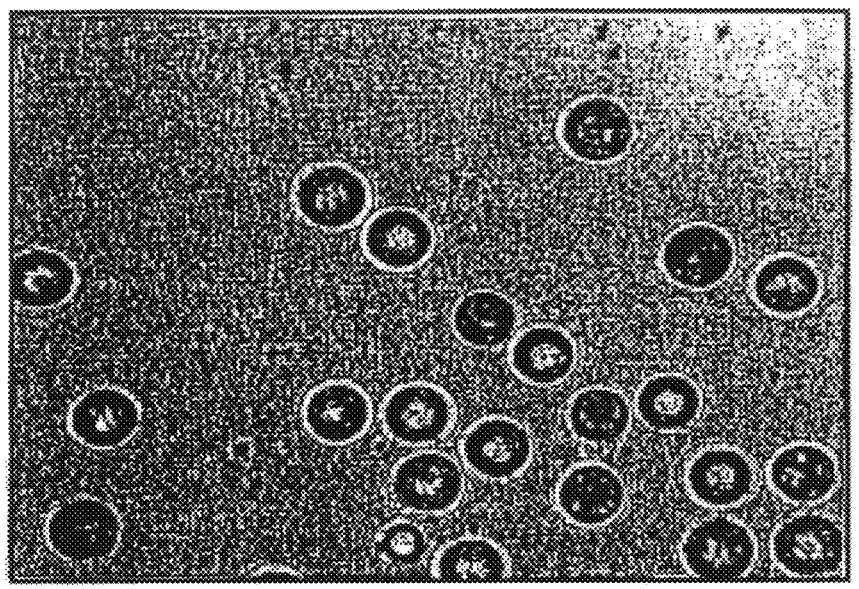
FIG. 8 shows a particle formed by one of the embodiments of the present invention.
Figure 9:
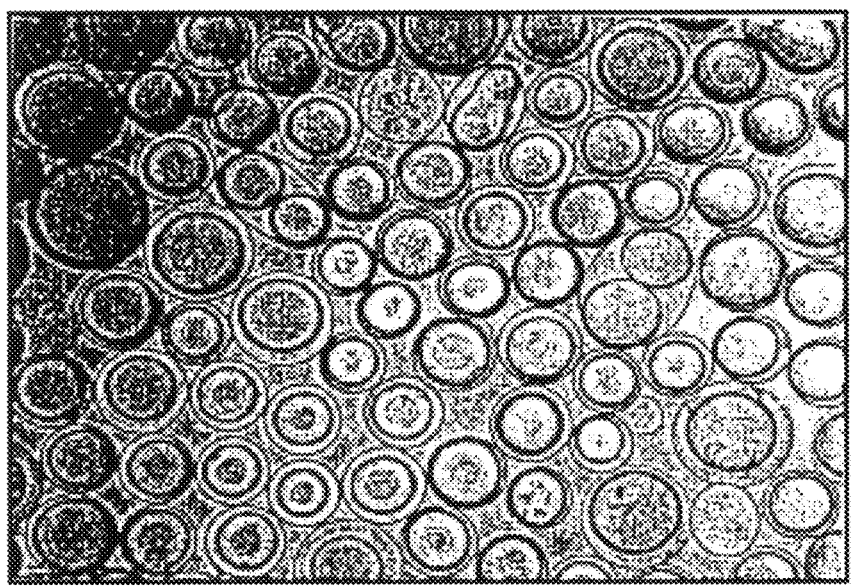
FIG. 9 shows a particle formed by one of the embodiments of the present invention.
Figure 10:
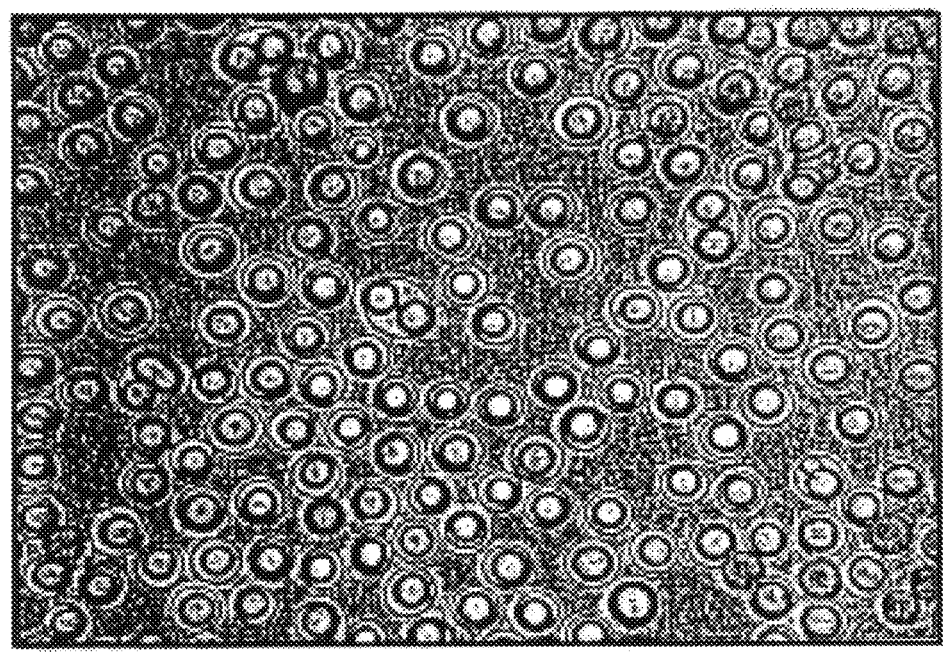
FIG. 10 shows a particle formed by one of the embodiments of the present invention.

As displayed in FIG. 6, the homogeneous beads are quite regular. As shown in FIG. 7 the agarose coating of the polystyrene cores as made by Example 2 below is very uniform. In fact, with mono-dispersed polystyrene cores, the single cored gel particles are within 5% deviation, which is probably the most uniform gel media ever reported. FIG. 8 shows the agarose coating on alkali resistant cores of Example 3 below. FIG. 9 shows agarose cored agarose coated beads made according to Example 4. FIG. 10 shows multilayered beads according to Example 5.

Since the pumping rate is high, the process throughput is practically unlimited. Each static mixer can produce up to 150 L/h of beads. Since the size of this mixer is generally no larger than a pencil, hooking up a number of these mixers in parallel one can mass produce very uniform beads inexpensively. To generate the beads, it takes no more than one or more pumps and a number of inexpensive static mixers. With this technology, it is possible to create a truly continuous bead production system as illustrated in the Figures. Another advantage of this system is that the same system can be used either for making cored beads or homogenous beads. However, with homogeneous beads, the distribution of size will be wider as the core is absent to control the final size of the bead.

Any agarose can be used in the present invention. One suitable agarose is D-5 from Hispanagar. The agarose is generally used in a concentration of from about 1 to about 25% weight in the aqueous solution.

The cores of the coated agarose of the present invention can be made of any material that is useful in chromatography. For example, the core may be a crossed linked agarose bead (whether made by the present process or any other process), a plastic, metal, glass or ceramic. Preferably when the finished bead is to have high rigidity, the core is selected from a material that is doesn't melt at the temperatures used in the present process and which is self-supportive. Suitable materials include but are not limited to plastics such as polystyrene, polyethylene, polypropylene, blends of polyethylene and polypropylene, multilayered polyethylene/polypropylene beads, acrylics, polysulfones, polyethersulfones, PVDF or PTFE; glass such as borosilicate glass, alkali resistant glass and controlled pore glass, metals such as stainless steel, nickel, titanium, palladium and cobalt or various iron, iron containing or other magnetized metals alloys and blends; and ceramics, such as silicate materials, zirconia and various ceramic blends.

The cores are preferably of a generally spherical or irregular particulate shape. Their diameter depends upon the size of bead one desires but preferably are from about 30 microns to about 150 microns in diameter.

As is common in agarose bead manufacture, various additives can be used to enhance production or add a property to the beads.

One class of additives comprises volatile organics, miscible with the solution. Examples are monohydric alcohols such as methanol, ethanol, and propanols. These can be used up to concentrations that give a slightly cloudy solution. Higher amounts of these alcohols can cause precipitation of the agarose. Miscible ketones such as acetone can also be used, but care must be used as the solubility of agarose is less in ketone-water mixtures. Any mixture of two or more of these materials is also contemplated.

A further class of additives comprises non-volatile miscible organics. Non-limiting examples of these included glycerine, ethylene glycol, methyl pentane diol, diethylene glycol, propylene glycol, triethylene glycol, the methyl, ethyl, or n-butyl ethers of ethylene glycol, the dimethyl or diethyl ethers of ethylene glycol, ethylene glycol dimethyl ether acetate ethylene glycol diethyl ether acetate, diethylene glycol methyl ether, diethylene glycol ethyl ether, diethylene glycol n-butyl ether, diethylene glycol dimethyl ether, diethylene glycol diethyl ether, diethylene glycol dimethyl ether acetate, diethylene glycol diethyl ether acetate, N-methyl morpholine, N-ethyl morpholine, and the like. Polyethylene glycols of low molecular weight are also examples of materials that are in this class. Any mixture of two or more of these materials is also contemplated.

Another class of additives comprises water-soluble polymers, which include by way of examples, polyvinyl pyrrolidone, polyvinyl alcohol, polyethylene glycols, dextrans, and water-soluble polyacylamides, including substituted polyacylamides, such as polydimethylacrylamide. These polymeric additives can be used as blends with the agarose in the initial dissolution step, or they can be dissolved in the solution after the addition and dissolution of the agarose. Care must be taken not to add an excessive amount of polymer, as coagulation of the solution may occur. Ratios of polymer to agarose of from about 0.1 to 10 are possible. Preferred polymers are polyvinyl alcohol, dextrans and polyacrylamides.

Additionally, one or more emulsifiers or surfactants can be added to the solution. Each combination of solution type will require some experimentation to determine the optimum type and amount of emulsifier or surfactant. These can be used in concentrations of from about 0.001% to about 10%, preferably from about 0.01% to about 5% by total weight of the solution. The emulsifier is added to the oil and is not water soluble.

The agarose may then be crosslinked if desired by any of the chemistries commonly used in the industry to crosslink materials containing multiple hydroxyl groups, such as polysaccharide beads, these chemistries being as non-limiting examples, epichlorohydrin or other multifunctional epoxy compounds, various bromyl chemistries or other multifunctional halides; formaldehyde, gluteraldehyde and other multifunctional aldehydes, bis(2-hydroxy ethyl)sulfone, dimethyldichlorosilane, dimethylolurea, dimethylol ethylene urea, diisocyanates or polyisocyanates and the like.

It may also have one or more functionalities applied to it, including ligands, such as Protein A or Protein G, natural or recombinatorily derived versions of either, modified versions of protein A or G to render them more caustic stable and the like, various chemical ligands such as 2-aminobenzimidazole (ABI), aminomethylbenzimidazole (AMBI), mercaptoethylpyridine (MEP) or mercaptobenzimidazole (MBI), or various chemistries that render the agarose cationic, anionic, philic, phobic or charged, as is well-known in the art of media formation.

Functional groups used in liquid chromatography that are adaptable to the present invention include groups such as, but not limited to, ion exchange, bioaffinity, hydrophobic, groups useful for covalent chromatography, thiophilic interaction groups, chelate or chelating, groups having so called pi-pi interactions with target compounds, hydrogen bonding, hydrophilic, etc.

These groups may be added after the agarose bead has been formed and crosslinked or they may be added to the initial solution and the composition of the initial solution is modified accordingly, such as pH being lowered or raised, so that the reaction to link the functional groups to the agarose occurs concurrently with the crosslinking reaction.

One application of the homogeneous agarose beads is for use in packed-bed liquid chromatography. One example is gel filtration chromatography where the sample constituents are separated based on their size. Another example is ion exchange chromatography where charged groups are attached to the agarose matrix and separation of constituents in the samples effected by ionic interactions. Another example of the application of homogeneous agarose beads is affinity chromatography. Affinity ligands can be covalently attached to the agarose media and offer a highly selective separation route for sample constituents.

One application for the cored beads is to provide rigidity and to control the mass transfer path of the packed-bed media. A rigid media can be stacked higher, thus attaining higher absorbing or exchanging capacity. By shortening the diffusion path, the gel can be utilized at a much higher efficiency than homogeneous beads. Under certain operating conditions, cored beads can result in sharper elution peaks and less buffer consumption.

Another application of the cored beads is in fluidized bed chromatography or magnetic chromatography where the core provides the required density (for fluidized beds) or the magnetic properties for the magnetized chromatography.

EXAMPLE 1

Homogeneous Bead 1000 ml of 6% agarose solution (D-5 Agarose from Hispanagar) was added to 2000 ml of mineral oil containing 120 ml of Span 80 emulsifier in a first oil bath at 80° C. under constant agitation to obtain an emulsion in which the oil phase is continuous. The emulsion was then pumped through a 0.5 inch (12.7 mm) diameter, 6 inches (152.4 mm) long Kenics static mixer (KMR-SAN-12) at a flow rate of 3 L/min into a second bath of mineral oil at 5° C. Spherical homogeneous agarose beads were obtained with a largest particle diameter of 200 um.

EXAMPLE 2

Polystyrene Cored Bead 300 ml of 80 um diameter, monosized, polystyrene spheres (Dynoseeds TS-80-13 from Microbeads) was mixed with 900 ml of 4% agarose solution (D-5 Agarose from Hispanagar) to obtain a slurry. The agarose-core mixture was added to 2000 ml of mineral oil at 80° C. containing 120 ml of Span™ 80 emulsifier under constant agitation to obtain an emulsion in which the oil phase is continuous. The emulsion was then pumped through a 0.5 inch (12.7 mm) diameter, 6 inches (152.4 mm) long Kenics static mixer (KMR-SAN-12) at a flow rate of 9 L/min into mineral oil at 5° C. The resulting core beads had an estimated coating thickness of 10 um and the bead population was predominately (>50% volume) single-cored.

EXAMPLE 3

Alkali Resistant Glass Bored Bead 200 ml of alkali-resistant glass spheres of 100 um average diameter (Mo-Sci Corporation) was mixed with 200 ml of 6% agarose solution (D-5 Agarose from Hispanagar) to obtain a slurry. The agarose-core mixture was added to 2000 ml of mineral oil containing 120 ml of Span at 90° C. under constant agitation to obtain an emulsion in which the oil phase is continuous. The emulsion was then pumped through a 0.5 inch (12.7 mm) diameter, 6 inches (152.4 mm) long Ross ISG static mixer at a flow rate of 3 L/min into mineral oil at 5° C. The resulting core beads had an estimated coating thickness of 10 um and the bead population was predominantly single-cored (>50%).

EXAMPLE 4

Agarose Cored Bead 900 ml of 15% agarose solution (D-5 Agarose from Hispanagar) was added to 2000 ml of mineral oil containing 120 ml of Span™ 80 emulsifier in a first oil bath at 80° C. under constant agitation to obtain an emulsion in which the oil phase is continuous. The emulsion was then pumped through a 0.5 inch (12.7 mm) diameter, 6 inches (152.4 mm) long Kenics static mixer (KMR-SAN-12) at a flow rate of 3 L/min into a second bath of mineral oil at 5° C. Spherical homogeneous agarose beads were obtained with a largest particle diameter of 200 um. The beads were then cross-linked using epichlorohydrin by the process described in [1]. 75 ml of 15% cross-linked agarose spheres (cores) of 100 um average diameter was mixed with 100 ml of 4% agarose solution (D-5 Agarose from Hispanagar) to obtain a slurry. The agarose-core mixture was added to 2000 ml of mineral oil containing 40 ml of Span 80 at 80° C. under constant agitation to obtain an emulsion in which the oil phase is continuous. The emulsion was then pumped through a 0.5" diameter, 6" long Ross ISG static mixer at a flow rate of 3 L/min into mineral oil at 5° C. The resulting core beads had an estimated coating thickness of 10 um and the bead population was predominantly single-cored. (>50%)

EXAMPLE 5

Bead with Multiple Coatings 300 ml of 63-75 um diameter, borosilicate glass spheres (Mo-Sci Corporation, GL0179) was mixed with 900 ml of 6% agarose (D-5 Agarose from Hispanagar) solution to obtain a slurry. The agarose-core mixture was added to 2000 ml of mineral oil containing 120 ml of Span™ 80 emulsifier at 90° C. under constant agitation to obtain an emulsion in which the oil phase is continuous. The emulsion was then pumped through a 0.5 inch (12.7 mm) diameter, 6 inches (152.4 mm) long Ross ISG static mixer at a flow rate of 9 L/min into mineral oil at 5° C. The resulting cored beads had an estimated agarose coating thickness of 10 um and the bead population was predominantly (>50% volume) single-cored. The agarose coating was crosslinked according to Porath [1] and functionalized for anion exchange purposes. 25 ml of the beads were then mixed into 150 ml of 3% agarose solution (D-5 Agarose from Hispanagar) to obtain a slurry. The agarose-beads mixture was added to 1000 ml of mineral oil at 90° C. under constant agitation to obtain an emulsion in which the oil phase is continuous. The emulsion was then pumped through a 0.5 inch (12.7 mm) diameter, 6 inches (152.4 mm) long Kenics static mixer (KMR-SAN-12) at a flow rate of 3 L/min into mineral oil at 5° C. The resulting double-coated core beads had an estimated second coating thickness of 10 um and the bead population was predominantly single-cored. (>50%)

The invention claimed is:

1. An apparatus for making agarose coated beads comprising:
   (a) a first vessel comprising an inlet for the introduction of agarose and the first vessel being capable of being heated to a temperature at or above the gelation point of agarose, thereby resulting in an aqueous agarose solution;
   (b) a first bath comprising a first inlet, a second inlet and an outlet, wherein the first bath contains a hydrophobic liquid and a water-in-oil emulsifier and is capable of being maintained at a temperature at or above the gelation point of the agarose, wherein the first inlet is used for the introduction of the hydrophobic liquid and the second inlet is used for the introduction of the agarose solution, and wherein the second inlet is in fluid communication with the first vessel;
   (c) a static mixer comprising an inlet in fluid communication with the outlet of the first bath and comprising an outlet;
   (d) a second bath comprising an inlet in fluid communication with the outlet of the static mixer; the second bath containing a hydrophobic liquid maintained at a temperature below the gelation point of the agarose and comprising an outlet.

2. The apparatus of claim 1, wherein the outlet from the second bath is used for recovering the coated beads.

3. An apparatus for making agarose coated beads comprising:
   (a) a first heat exchanger comprising a first outlet and capable of being at a temperature at or above a gelation point of the agarose for dissolving the agarose to result in an aqueous agarose solution and for mixing a plurality of bead cores with the dissolved agarose;
   (b) a second heat exchanger comprising a second outlet and capable of being at a temperature at or above the gelation point of the agarose and containing a first hydrophobic liquid and an oil-in-water emulsifier;
   (c) a first static mixer comprising an inlet and an outlet, wherein the first outlet from the first heat exchanger and the second outlet from the second heat exchanger merge into the inlet of the first static mixer to create an emulsion of the solution from the first heat exchanger and the first liquid of the second heat exchanger;
   (d) a second static mixer comprising an inlet and an outlet, wherein the inlet is connected to the outlet from the first static mixer for creating agarose droplets having one or more bead cores and an agarose coating; and
   (e) a third heat exchanger comprising an inlet and an outlet, wherein the inlet is connected to the outlet from the second static mixer, wherein the third heat exchanger is capable of cooling to a temperature below the gelation point of the agarose in order to cause the agarose to gel.

4. The apparatus of claim 3, wherein the agarose droplets gel into agarose beads.

5. An apparatus for making agarose beads comprising:
   (a) a tank comprising a first outlet for gelation of agarose in an aqueous solution;

(b) a bath comprising a second outlet for heating a first hydrophobic liquid and an emulsifier at or above the gelation point of agarose;
(c) a static mixer comprising an inlet and an outlet, wherein the first outlet from the tank and the second outlet from the bath merge into the inlet of a static mixer to create an emulsion of the solution from the tank and the bath;
(d) a heat exchanger comprising an inlet and an outlet, wherein the outlet from the static mixer is connected to the inlet of the heat exchanger and wherein the heat exchanger is capable of cooling to a temperature below the gelation point of the agarose in order to cause the droplets to gel into agarose beads.

6. An apparatus for making agarose beads comprising:
(a) a first heat exchanger comprising a first outlet, at a temperature at or above a gelation point of the agarose for dissolving the agarose in an aqueous solution;
(b) a second heat exchanger comprising a second outlet, at a temperature at or above the gelation point of the agarose for heating a first hydrophobic liquid and an emulsifier:
(c) a first static mixer comprising an inlet and an outlet, wherein the first outlet from the first heat exchanger and the second outlet from the second heat exchanger merge into the inlet of the first static mixer to create an emulsion of the solution from the first heat exchanger and the first liquid of the second heat exchanger,
(d) a third heat exchanger comprising an inlet and an outlet, wherein the outlet from the first static mixer is connected to the inlet of a third heat exchanger, and wherein the third heat exchanger is capable of cooling to a temperature below the gelation point of the agarose in order to cause formation of agarose beads.

* * * * *